April 5, 1966     D. B. POYNTER     3,244,420
MINIATURIZED BASKET-BALL BACKBOARD
Filed June 5, 1963
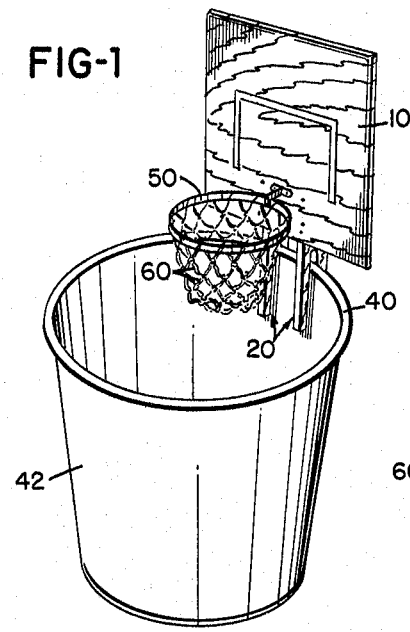
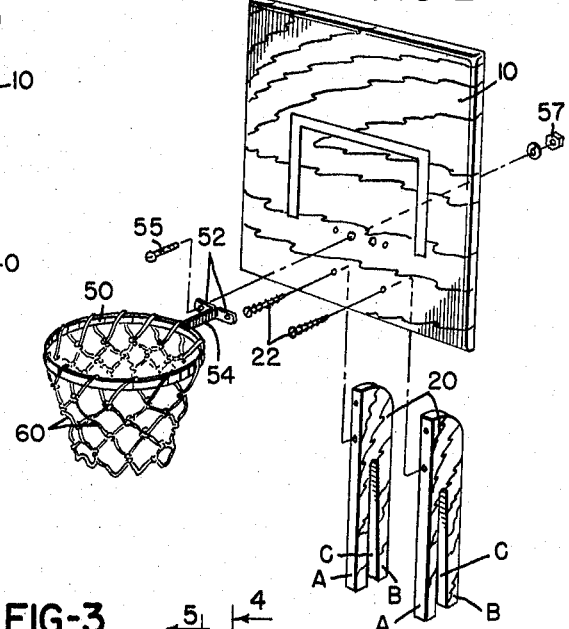
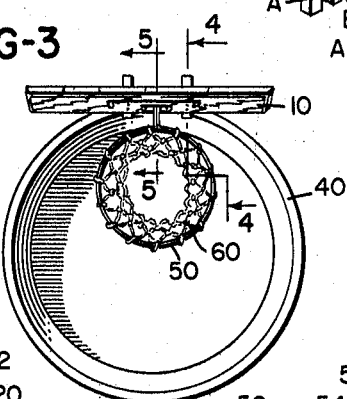
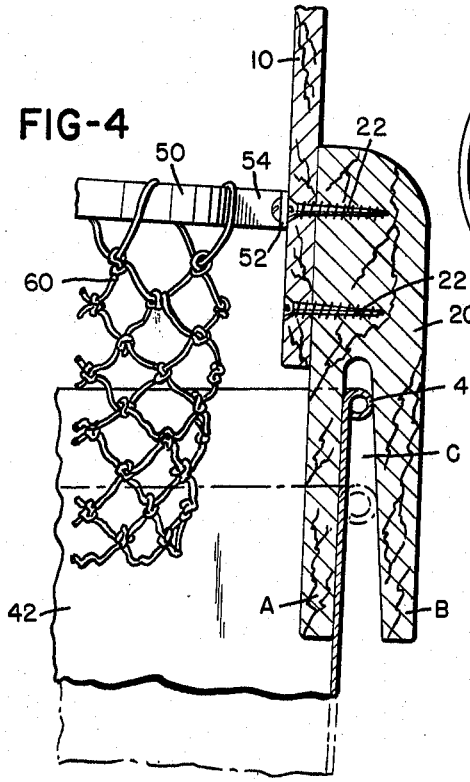
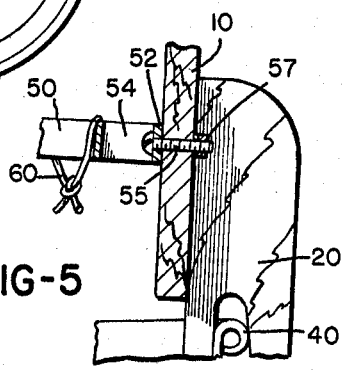
INVENTOR.
DONALD B. POYNTER
BY
*Kinney & Schenk*
ATTORNEYS

United States Patent Office 3,244,420
Patented Apr. 5, 1966

3,244,420
MINIATURIZED BASKET-BALL BACKBOARD
Donald B. Poynter, Cincinnati, Ohio, assignor to Poynter Products, Inc., Cincinnati, Ohio, a corporation of Ohio
Filed June 5, 1963, Ser. No. 285,620
5 Claims. (Cl. 273—105)

This invention relates to a miniaturized basket-ball backboard which is adapted to be securely though releasably associated with the upper peripheral rim of a receptacle, such as, by way of example, a waste basket, or the like.

An object of the invention is to provide a miniature basket-ball backboard with means for enabling it to be attached to the upper peripheral rim of a waste basket or the like for disposing the backboard in upstanding relationship above the rim and for disposing a rim and net forwardly and over the open upper portion of the waste basket, whereby articles may be directed into the waste basket by tossing them through said rim and net.

These and other objects are attained by the means described herein and as disclosed in the accompanying drawings in which:

FIG. 1 is a perspective view of a device of the present invention operatively associated with a conventional waste basket.

FIG. 2 is an exploded view illustrating the various component parts of the device.

FIG. 3 is a top plan view of FIG. 1.

FIG. 4 is a sectional view taken on line 4—4 of FIG. 3.

FIG. 5 is a sectional view taken on line 5—5 of FIG. 3.

With reference now to the drawings, the numeral 10 denotes a panel fabricated from suitable sheet material such as paper, plastic, wood, metal, screening or the like, characterized by its rigidity.

The numeral 20 denotes generally a pair of depending legs or attachment members, the lower ends of which are bifurcated to provide furcations A and B, the adjacent surfaces of which define the sides of an upwardly tapering or substantially U-shaped slot C dimensioned, as shown in FIG. 4, to receive and frictionally engage the upper peripheral rim 40 of a conventional waste basket 42.

Depending legs 20 may be secured to panel 10 by means of screws 22 which project through panel 10 as clearly illustrated in FIG. 4.

The numeral 50 denotes a circular rim integral with and projecting forwardly from out-turned mounting members 52 from which it is spaced by the length of intermediate member 54.

An open top-open bottom net 60 is adapted to be secured to and carried by rim 50, access to the interior of said net being defined by rim 50, the lower end of said net being open whereby to permit articles to freely pass therethrough.

Members 52 may be secured to panel 10 by means of bolts 55 which pass through panel 10 and nuts 57 as illustrated in FIG. 5.

From the foregoing, it should be noted that I have thus provided simple, yet highly effective means, for securely though releasably mounting a miniaturized basket-ball backboard or panel 10 relative to and projecting above the peripheral rim 40 of a waste basket or other receptacle 42 in such a manner as to dispose rim 50 and its associated net 60 above and in open communication with the interior of container 42, as clearly illustrated in FIGS. 1 and 3.

If desired, panel 10 may be fabricated from wire with attachment means formed integral therewith for defining a framework to receive or support the equivalent of panel 10.

It should be understood that various changes and modifications may be made in the structural details of the device within the scope of the appended claims, without departing from the spirit of the invention.

What is claimed is:

1. A miniature basket-ball backboard structure, comprising a board body having a front side, an open top ball receiving basket, means attached to said basket and secured to said front side of the board body for supporting said ball basket in operative position forwardly of said front side of the board body, and means carried by said board body for mounting the latter in vertical operative position upon the top edge rim of a waste basket in upwardly extending relation therewith and with said ball receiving basket disposed over the open top of the waste basket, said means being so disposed that no part thereof lies in the path of the ball entering said waste basket.

2. The invention according to claim 1, wherein the last said means is formed to releasably engage and hold the said top edge rim of said waste basket in a manner to maintain said board in said operative position.

3. The invention according to claim 1, wherein the last said means comprises at least one elongate member secured to said board and having a downwardly opening slot adapted to receive said top edge rim of said waste basket to support the board thereon for free lifting detachment therefrom.

4. The invention according to claim 1, wherein said board body has a bottom edge and the last said means consists of a pair of spaced elongate leg members secured to the board body and extending downwardly below said bottom edge thereof and each of said leg members is bifurcated in its lower end portion and has the furcations in upwardly converging relation.

5. The invention according to claim 4, wherein the said furcations of each of the legs have a spacing at the upper ends thereof such as to effect frictional engagement with the top edge rim of the said waste basket.

References Cited by the Examiner

UNITED STATES PATENTS

| 2,658,495 | 11/1953 | Elliot | 273—105 X |
| 2,818,254 | 12/1957 | Dunn | 273—105 X |
| 3,092,387 | 6/1964 | Wagner | 273—105 X |

FOREIGN PATENTS

| 1,142,043 | 3/1957 | France. |

DELBERT B. LOWE, Primary Examiner.
MAX R. PAGE, Assistant Examiner.